(12) United States Patent
Bondarenko et al.

(10) Patent No.: US 10,301,929 B2
(45) Date of Patent: May 28, 2019

(54) SYSTEM AND METHOD FOR LEAK DETECTION

(71) Applicant: Halliburton Energy Services, Inc., Houston, TX (US)

(72) Inventors: Oleg Bondarenko, Spring, TX (US); Ryan Le, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/542,319

(22) PCT Filed: Feb. 10, 2015

(86) PCT No.: PCT/US2015/015228
§ 371 (c)(1),
(2) Date: Jul. 7, 2017

(87) PCT Pub. No.: WO2016/130113
PCT Pub. Date: Aug. 18, 2016

(65) Prior Publication Data
US 2018/0274359 A1    Sep. 27, 2018

(51) Int. Cl.
*E21B 47/10*    (2012.01)
*E21B 47/00*    (2012.01)
*E21B 49/00*    (2006.01)
*G01V 1/46*    (2006.01)
(Continued)

(52) U.S. Cl.
CPC ........ *E21B 47/101* (2013.01); *E21B 47/0005* (2013.01); *E21B 49/00* (2013.01); *G01V 1/46* (2013.01); *E21B 47/011* (2013.01); *E21B 47/12* (2013.01); *G01V 2210/121* (2013.01);
(Continued)

(58) Field of Classification Search
USPC .......................................... 340/871; 367/81
See application file for complete search history.

(56) References Cited

U.S. PATENT DOCUMENTS

| 2,884,624 | A | 4/1959 | Dean et al. |
| 3,508,433 | A | 4/1970 | Bustin |
| 6,647,762 | B1 | 11/2003 | Roy |

(Continued)

FOREIGN PATENT DOCUMENTS

| CA | 2783089 A | 1/2014 |
| WO | WO 2014/169965 A1 | 10/2014 |

OTHER PUBLICATIONS

International Search Report and the Written Opinion of the International Search Authority, or the Declaration, dated Sep. 25, 2015, PCT/US2015/015228, 14 pages, ISA/KR.
(Continued)

*Primary Examiner* — Omar Casillashernandez
(74) *Attorney, Agent, or Firm* — Haynes & Boone, LLP (57) ABSTRACT

A method and logging tool for evaluating leakage within a wellbore. In an embodiment, a percussive hammer assembly is selectively actuated to strike the interior wall of a casing, thereby propagating a sound wave along the casing. An array of acoustic detectors are selectively recorded during short time windows based on sound propagation times from the percussive hammer assembly to each acoustic detector, thereby avoiding the need to continuously sample acoustic detectors and collecting voluminous data. A self-tuning mode may be provided to determine sound propagation times.

16 Claims, 6 Drawing Sheets

(51) Int. Cl.
  *E21B 47/01* (2012.01)
  *E21B 47/12* (2012.01)

(52) U.S. Cl.
  CPC .......... *G01V 2210/127* (2013.01); *G01V 2210/1299* (2013.01); *G01V 2210/1429* (2013.01)

(56) References Cited

U.S. PATENT DOCUMENTS

| | | |
|---|---|---|
| 7,289,918 B2 | 10/2007 | Nagase |
| 7,523,666 B2 | 4/2009 | Thompson et al. |
| 8,307,725 B2 | 11/2012 | Stubler et al. |
| 8,365,581 B2 | 2/2013 | Bühring |
| 8,401,796 B2 * | 3/2013 | Morikami ............. G01V 1/40 702/11 |
| 8,485,277 B2 | 7/2013 | Hulden et al. |
| 8,705,318 B2 * | 4/2014 | Zheng .................. G01V 1/42 175/24 |
| 2007/0137897 A1 | 6/2007 | Sanders et al. |
| 2008/0190605 A1 * | 8/2008 | Clapp ................ E21B 33/1246 166/250.17 |
| 2010/0076688 A1 * | 3/2010 | Moake .................. E21B 47/08 702/8 |
| 2011/0267922 A1 | 11/2011 | Shampine et al. |
| 2012/0185183 A1 * | 7/2012 | Takemura ................ G01F 1/66 702/48 |
| 2013/0021874 A1 | 1/2013 | Hartog et al. |
| 2013/0075091 A1 | 3/2013 | Hallundbaek |
| 2014/0028459 A1 | 1/2014 | Solomon |
| 2017/0074080 A1 * | 3/2017 | Peterson ................ E21B 28/00 |

OTHER PUBLICATIONS

Khulief, et al., "Acoustic Detection of Leaks in Water Pipelines Using Measurements Inside Pipe," *Journal of Pipeline Systems Engineering and Practice*, May 2012, vol. 3, Issue 2, pp. 47-54.

* cited by examiner

SYSTEM AND METHOD FOR LEAK DETECTION

PRIORITY

The present application is a U.S. National Stage patent application of International Patent Application No. PCT/US2015/015228, filed on Feb. 10, 2015, the benefit of which is claimed and the disclosure of which is incorporated herein by reference in its entirety.

TECHNICAL FIELD

The present disclosure relates generally to oilfield measurement equipment, and in particular to downhole tools, drilling systems, and drilling techniques for drilling wellbores in the earth. More particularly still, the present disclosure relates to logging systems and methods for measuring one or more characteristics within a wellbore indicative of a fluid leak event.

BACKGROUND

Downhole formation fluid (oil and gas) leakage may occur through production tubing, casing, or annular cement sheath in between the casing and formation. Such a fluid leakage may become problematic when either water transports to a production zone or a rich quality production zone communicates with a poor quality production zone through the flow channel created by the leak. If fluid constrained within an annulus becomes pressurized, such as from a leak or thermal expansion, a pressure differential may overstress and/or rupture a casing or tubing wall. The phenomenon of trapped annulus pressure or annular pressure buildup is traditionally addressed by overdesigning casing strings and production tubing, with a concomitant cost penalty. Further, if the leak allows fluid flow between different zones, it may cause a temperature deviation from expected values in addition to the cross-contamination mentioned above. A formation fluid leak may induce dynamic pressure variation throughout the formation, casing, cementing annulus, and production tube.

Identification and accurate location of a downhole fluid leak event is challenging. Identification of a leak event may rely on measuring downhole acoustic or ultrasonic noise, using geophones or hydrophones, for example, with concomitant sampling, recording, and analysis of large volumes of digital data. Conventional leak detection logging tools may continuously sample acoustic data on many channels at high sample rates simultaneously. The vast quantity of sampled data form a fast data stream, which may invariably result in a low duty cycle. That is, conventional leak detection logging tools may only collect data during a low percentage of logging time while spending the remaining time saving the collected data to a large memory bank. Of all the collected acoustic data, only a small portion is typically used.

BRIEF DESCRIPTION OF THE DRAWINGS

Embodiments are described in detail hereinafter with reference to the accompanying figures, in which.

DETAILED DESCRIPTION

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

Figure 1:
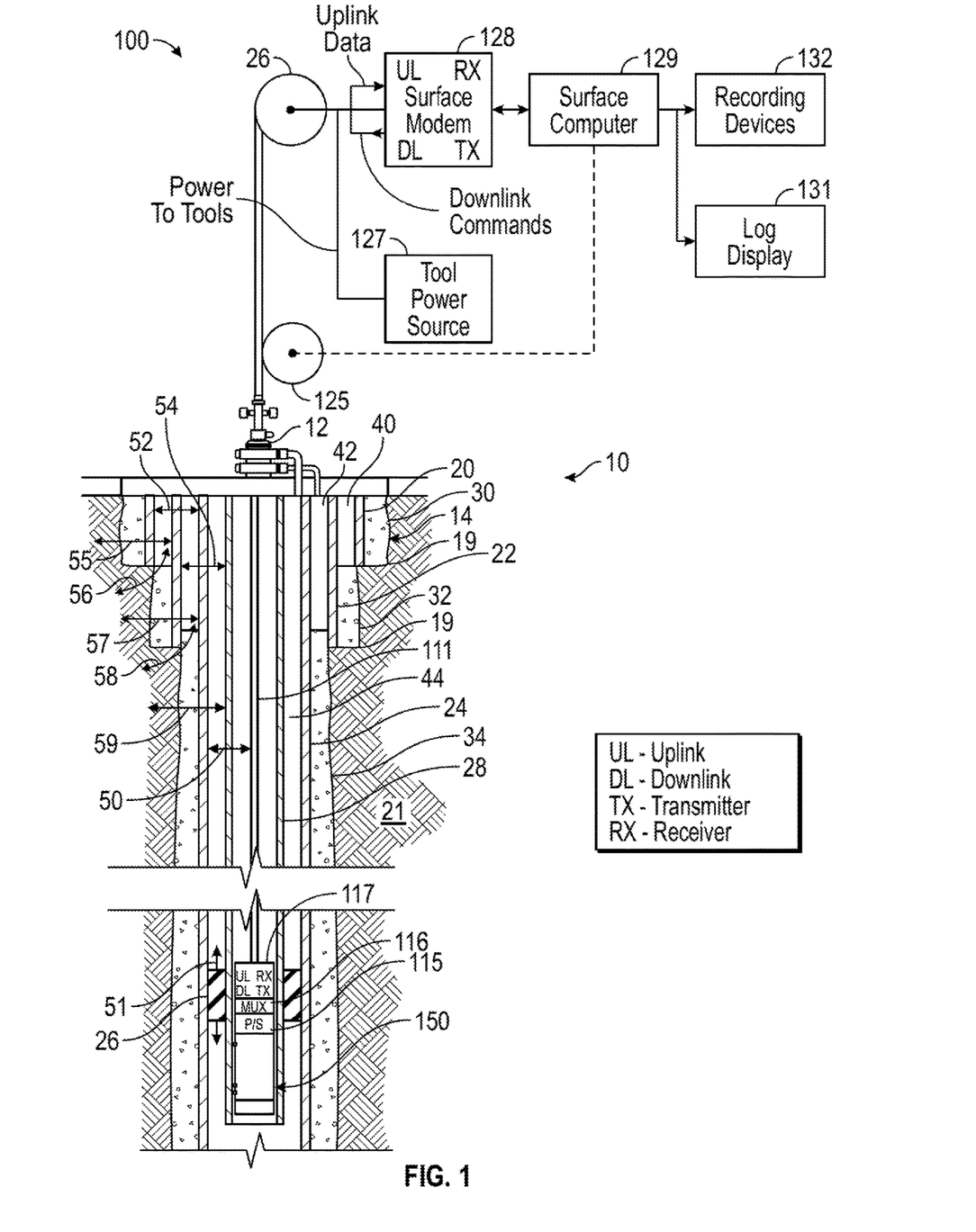
FIG. 1 is a simplified elevation view in partial cross section of a leak detection system according to an embodiment, showing a multiple parameter sensing logging tool suspended by wireline in a well and various components at block level.

FIG. 1 shows a system view of a fluid leak detection system 100 according to an embodiment, for identification and evaluation of leakage within a well 10. Well 10 may include a well head 12 connected atop surface casing string 20 extending into the earth from the top of a wellbore 14. Well 10 may include additional, successively smaller diameter outer and inner casing strings 22, 24 concentrically installed in wellbore 14, each smaller string extending to a deeper depth than the previous string. Outer and inner casing strings 22, 24 may be suspended from casing hangers (not illustrated) landed, seated, and locked within well head 12 or otherwise positioned in wellbore 14. Similarly, production tubing 28 may be concentrically installed within inner casing 24, suspended from a tubing hanger (not illustrated) landed and seated within well head 12 or otherwise positioned in wellbore 14. Production tubing 28 may provide a conduit for producing hydrocarbons from formation 21.

Casing strings 20, 22, 24 may isolate wellbore 14 from the surrounding formation 21. The area between any two adjacent casing strings may define a casing annulus. For instance, as shown in FIG. 1, an inner annulus 44 (or "A annulus") may be defined between inner casing string 24 and production tubing 28, an outer annulus 42 (or "B annulus") may be defined between outer casing string 22 and inner casing string 24, and a surface casing annulus 40 (or "C annulus") may be defined between surface casing string 20 and outer casing string 22. Although three casing strings are illustrated in FIG. 1, another number of casing strings may be used as appropriate.

Surface casing string 20 may be cemented into place within wellbore 14 by an outer cement sheath 30. Similarly, outer and inner casing strings 22, 24 may be and cemented into place within wellbore 14 by cement sheaths 32, 34, respectively. Cement sheaths may extend so as to seal the lower end of each annulus, such as adjacent to a casing shoe 19. A packer 26 may be disposed between production tubing 28 and inner casing string 24 to seal lower end of inner annulus 44, or a packer may be positioned between adjacent casing strings, such as 20, 22, to seal the annulus therebetween above the cemented shoe. Additionally, each casing hanger may be sealed within well head 12 by a mechanical seal assembly (not illustrated) so that the upper end of each casing string is sealed from adjacent casings. Accordingly, any fluid located within a casing annulus may be isolated.

According to an embodiment, leak detection system 100 may include a logging tool 150. A logging cable 111 may suspend logging tool 150 in wellbore 14. Logging tool 150 may have one or more protective housings which may be fluid tight, be pressure resistant, and support and protect internal components during deployment. Logging tool 150 may include one or more subsystems to generate data useful in analysis of wellbore 14 or in determining the nature of formation 21 in which wellbore 14 is located.

Logging tool 150 may include a power supply 115. Output data streams from logging tool 150 may be provided to a multiplexer 116. Logging tool 150 may also include a communication module 117 having an uplink communication device, a downlink communication device, a data transmitter, and a data receiver.

Logging tool 150 may be designed and arranged so as to be combinable with other tools with suitable mechanical and electrical designs. Logging tool 150 may be combined with other tool sections designed for leak detection, cement sheath inspection, formation analysis, or the like.

Leak detection system 100 may include a sheave 125, which may be used in guiding logging cable 111 into wellbore 14. Cable 111 may be spooled on a cable reel 126 or drum for storage. Cable 111 may be let out or taken in to raise and lower logging tool 150 within wellbore 14. Conductors in cable 111 may connect with surface-located equipment, which may include a DC power source 127 to provide power to tool power supply 115, a surface communication module 128 having an uplink communication device, a downlink communication device, a data transmitter and receiver, a surface computer 129, a logging display 131, and one or more recording devices 132. Sheave 125 may be connected by a suitable detector arrangement to an input to computer 129 to provide logging tool depth measuring information. Computer 129 may provide an output for logging display 131 and recording device 132. Leak detection system 100 may collect data as a function of depth. Recording device 132 may be incorporated to make a record of the collected data as a function of wellbore depth. Computer 129 is illustrated as located at the surface of the well for real-time processing uplinked data and/or post processing data locally stored within memory located within logging tool 150.

Many possible fluid leakage paths may be present in well 10 as illustrated by arrows 50-52, 54, and 55-59. A fluid leakage may occur through a breach in production tube 28, thereby fluidly coupling the interior of production tube with inner annulus 44, as indicated by arrow 50. A leak across packer 26, illustrated by arrow 51, may also fluidly couple the interior of production tube with inner annulus 44. A breach in outer casing string 22, depicted by arrow 52, may fluidly couple surface casing annulus 40 with outer annulus 42. Similarly, a breach in inner casing string 24, depicted by arrow 54, may fluidly couple outer annulus 42 with inner annulus 44. Finally, fluid leakage may occur between formation 21 and various annuli. For instance, surface casing annulus 40 may be fluidly coupled with formation 21 via a breach in surface casing string 20 and cement sheath 30 or via a breach in cement sheath 32, as indicated by arrows 55, 56, respectively. Likewise, outer annulus 42 may be fluidly coupled with formation 21 via a breach in outer casing string 22 and cement sheath 32 or via a breach in cement sheath 34, as indicated by arrows 57, 58, respectively. And, inner annulus 44 may be fluidly coupled with formation 21 via a breach in inner casing string 24 and cement sheath 34, as indicated by arrow 59.

Figure 2A:
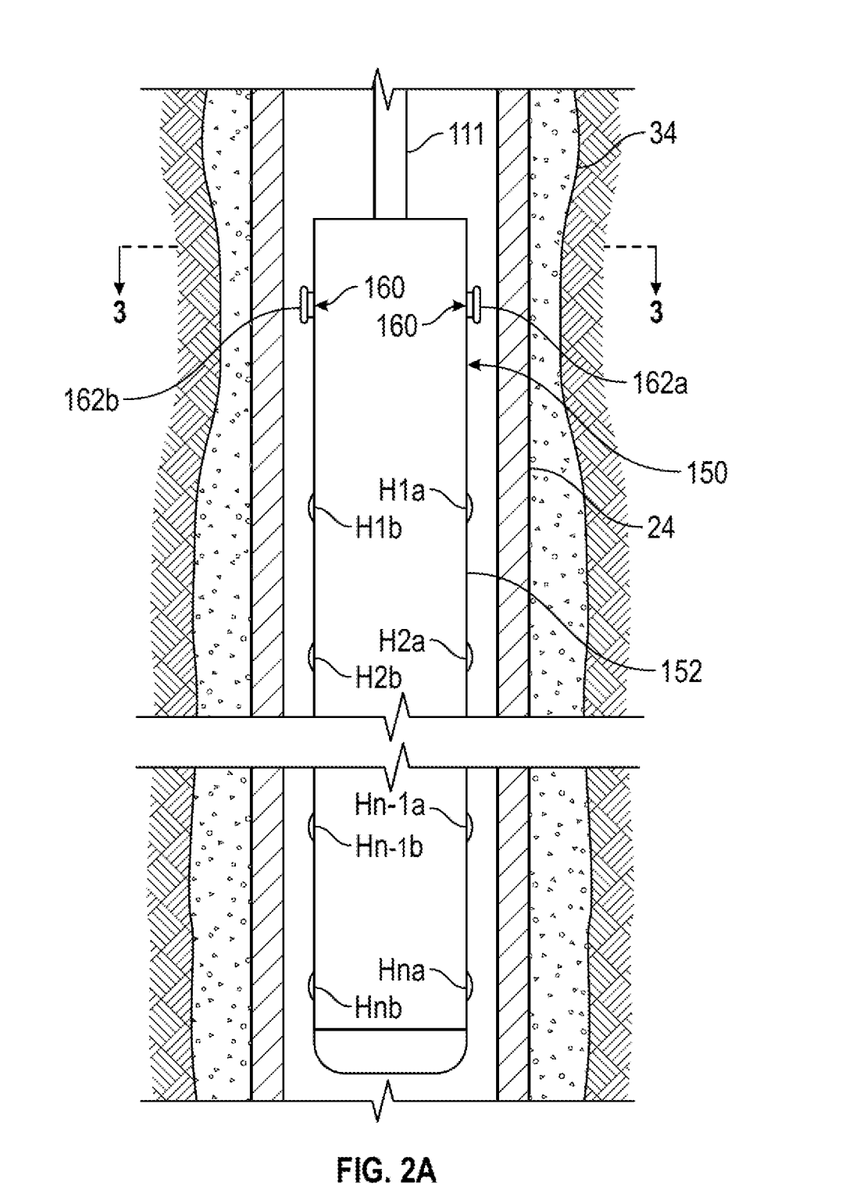
FIG. 2A is an elevation view in partial longitudinal cross section of a logging tool of the leak detection system of FIG. 1 according to an embodiment, showing a percussive hammer assembly in a retracted state and an array of acoustic detectors.

FIG. 2A illustrates logging tool 150 according to one or more embodiments. Logging tool 150 may include a housing 152, which may be fluid tight pressure resistant and which supports and protects internal components during deployment. Logging tool 150 may include one or more acoustic detectors, which may be circumferentially and/or longitudinally disposed within an array. As illustrated, rows of acoustic detectors H1, H2, . . . , $H_{n-1}$, $H_n$, are longitudinally positioned along logging tool 150, and each row of acoustic detectors includes two detectors, H1$a$, H1$b$, etc. the number of rows of acoustic detectors and the number of acoustic detectors per row may be varied according to operational needs. Acoustic detectors may include geophones, hydrophones, or other suitable detectors.

Logging tool 150 may include a percussive hammer assembly 160, which is shown in FIG. 2A and a retracted state. Percussive hammer assembly 160 may include one or more striking elements 162 which are operable to radially extend and retract with respect to housing 152. FIG. 2 illustrates two striking elements 162 disposed 180 degrees apart about housing 152. However any suitable number and circumferential or longitudinal arrangement may be used as appropriate. In one or more embodiments, striking elements 162$a$, 162$b$ are disposed in longitudinal alignment with acoustic detectors H1$a$, H1$b$, respectively.

Figure 2B:
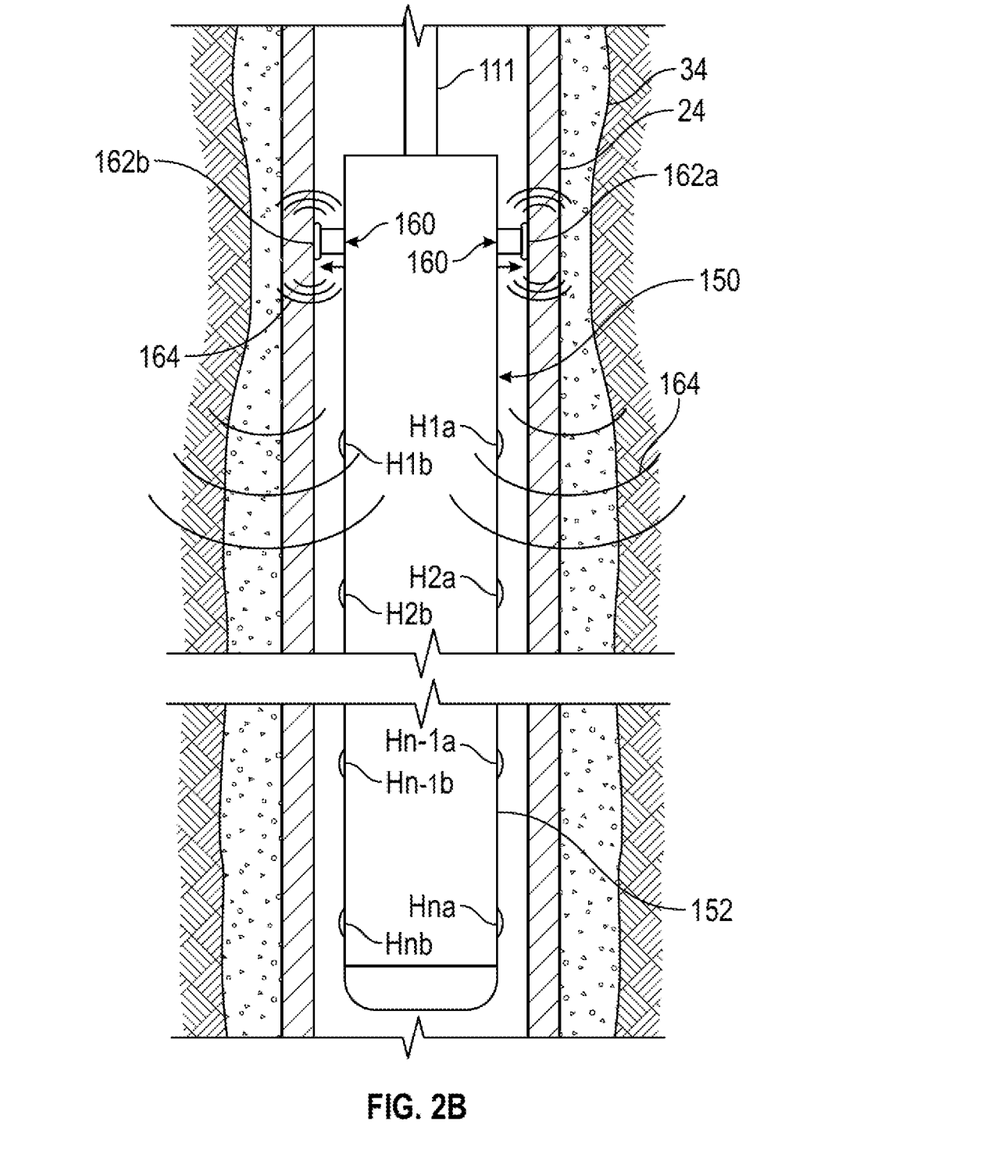
FIG. 2B is an elevation view in partial longitudinal cross section of the logging tool of FIG. 2A, showing the percussive hammer assembly after just having struck the interior wall of the wellbore casing.

FIG. 2B illustrates logging tool 150 with percussive hammer assembly 160 shown in an extended state, with striking elements 162 and contact with casing 24. Percussive hammer assembly 160 is designed and arranged to produce a quick knock to the interior wall of casing 24 to excite sound waves (illustrated by wave front lines 164). The sound waves propagate along casing 24 and may be detected by acoustic detectors H1 . . . $H_n$ within a short time interval after striking.

Figure 3A:
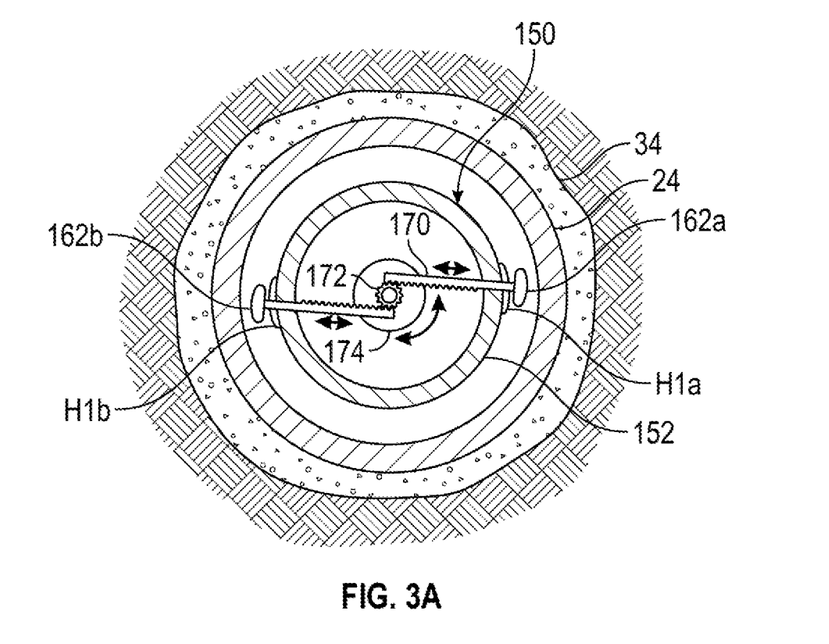
FIG. 3A is a transverse cross section of the logging tool of FIG. 2A taken along line 3-3 of FIG. 2A according to an embodiment, showing a rack and pinion-operated percussive hammer assembly.

Percussive hammer assembly 160 may be implemented in a number of ways. For example, referring to FIG. 3A, a rack and pinion configuration is illustrated according to one or more embodiments. Striking elements 162 are connected to racks 170, which are oriented so as to be generally perpendicular to the longitudinal axis of logging tool 150. A pinion 172 selectively driven by an electric motor 174 engages racks 170. As illustrated, rotation of pinion 172 in a clockwise direction functions to radially extend racks 170 and striking elements 162, thereby engaging the inner wall of casing 24 and creating an acoustic knock. Counterclockwise rotation of pinion 172 retracts racks 170 and striking elements 162. The rotation speed and torque of motor 174 and inertia of percussive hammer assembly 160 define the knock excitation amplitude. The rotation speed and torque of motor 174, which may be controlled by a central processing unit (CPU) 210, microcontroller, or other digital logic circuit (FIG. 4), may be adjusted according to particular well conditions.

Figure 3B:
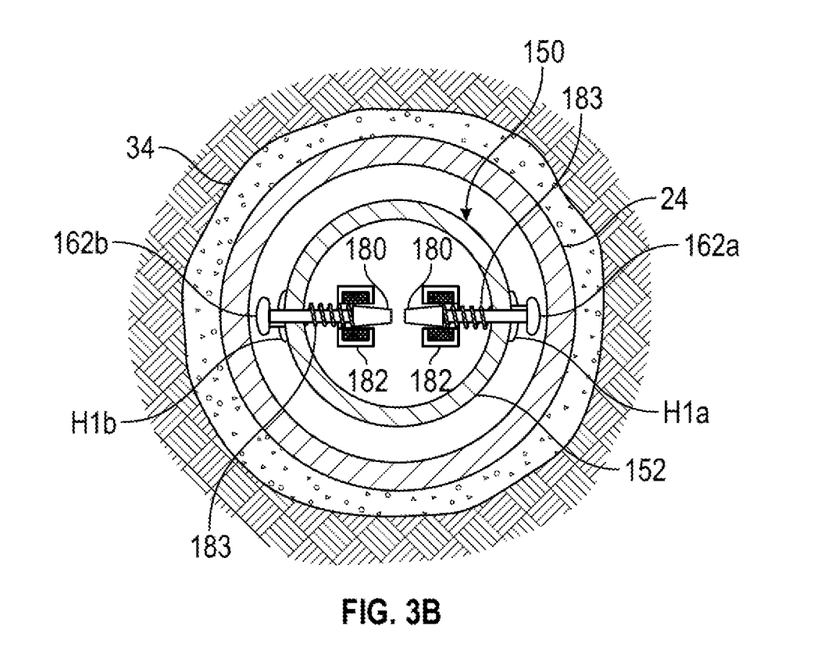
FIG. 3B is a transverse cross section of the logging tool of FIG. 2A taken along line 3-3 of FIG. 2A according to an embodiment, showing a solenoid-operated percussive hammer assembly.

Referring to FIG. 3B, an electromechanical solenoid configuration of percussive hammer assembly 160 is illustrated according to one or more embodiments. Each striking element 162 is connected to a plunger 180, which may be formed of ferromagnetic materials such as soft iron or steel. Plunger 180 is axially and slidably disposed partly within a cylindrical electric solenoid winding 182. A spring 183 biases striking element 162 radially inward. When a voltage is applied to electric solenoid winding 182, an axial magnetic flux is produced within winding 182 that causes plungers 180 to be rapidly pulled more fully into solenoid winding 182, thereby forcing striking element 162 radially outward against the inner wall of casing 24. Voltage to solenoid winding 182 may be selectively controlled by CPU 210.

Figure 3C:
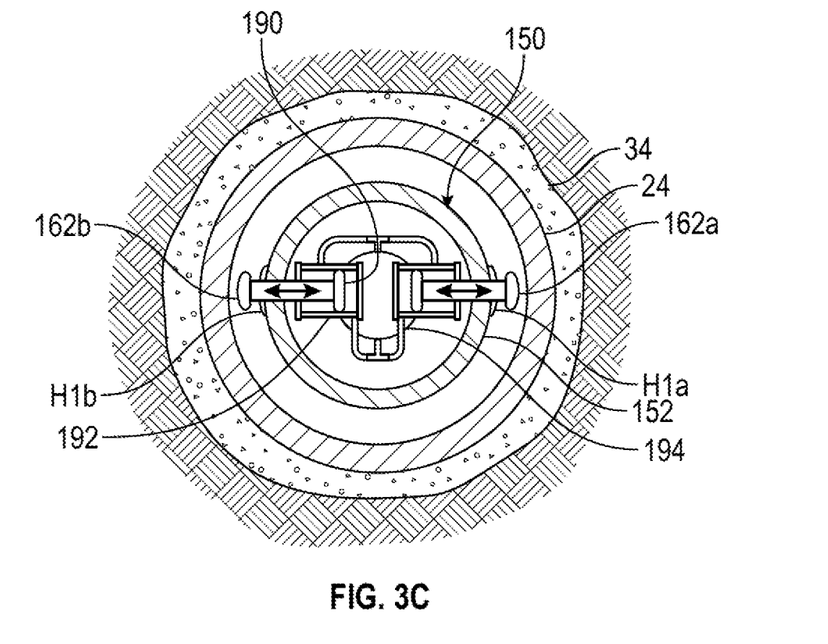
FIG. 3C is a transverse cross section of the logging tool of FIG. 2A taken along line 3-3 of FIG. 2A according to an embodiment, showing a piston/cylinder-operated percussive hammer assembly.

FIG. 3C illustrates a piston-cylinder configuration of percussive hammer assembly 160 according to one or more embodiments. Each striking element 162 is connected to a piston 190, which is axially and slidably disposed within a hydraulic or pneumatic cylinder 192. Cylinder 192 is fluidly connected on both sides of piston 190 to a bidirectional fluid pump 194. Fluid may be selectively transferred from one side of piston 190 to the other side by pump 194 to either extend or retract striking element 162. Pump 194 may be selectively controlled by CPU 210.

Figure 4:
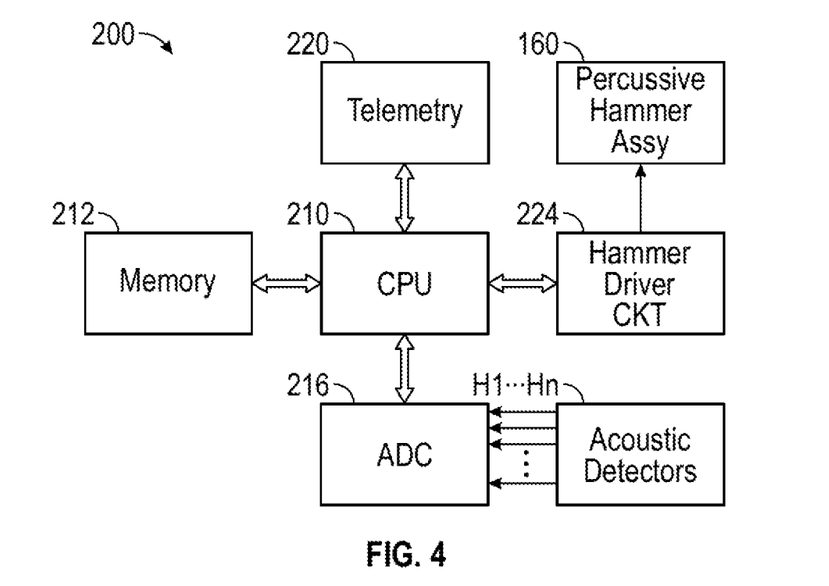
FIG. 4 is a block level schematic of a logging control system of the downhole tool of FIG. 2A according to an embodiment.

FIG. 4 is a block level schematic of a logging control system 200 of logging tool 150 according to one or more embodiments. Discrete electronic components may be combined in one or more application-specific integrated circuits (ASICs) as appropriate. CPU 210 may be a computer processor, such as a microprocessor, microcontroller (MCU), a field programmable gate array, or the like. CPU 210 may be operably coupled to memory 212 via a dedicated memory bus. Memory 212 may include both random access memory (RAM) and non-volatile memory such as Flash memory or electrically erasable programmable read-only memory (EEPROM). CPU 210 and memory 212 may also be operably coupled to an analog-to-digital converter (ADC) 216. ADC 216 may in turn be coupled to acoustic detectors H1 . . . $H_n$ for digitally sampling acoustic data therefrom. Telemetry circuitry 220 may also be operatively coupled to CPU 210 and memory 212 for transferring collected acoustic data to the surface and for receiving commands from the surface. Finally, CPU 210 is operatively coupled so as to control percussive hammer assembly 160 via a hammer driver circuit 224.

In one or more embodiments, CPU 210 may selectively control the timing of sampling and data collection from each individual acoustic detector H1 . . . $H_n$ in relation to the timing of actuation of percussive hammer assembly 160. CPU 210 may execute algorithmic instructions stored in memory 212 for controlling the logging functions to implement logging method 300 of FIG. 5.

Figure 5:
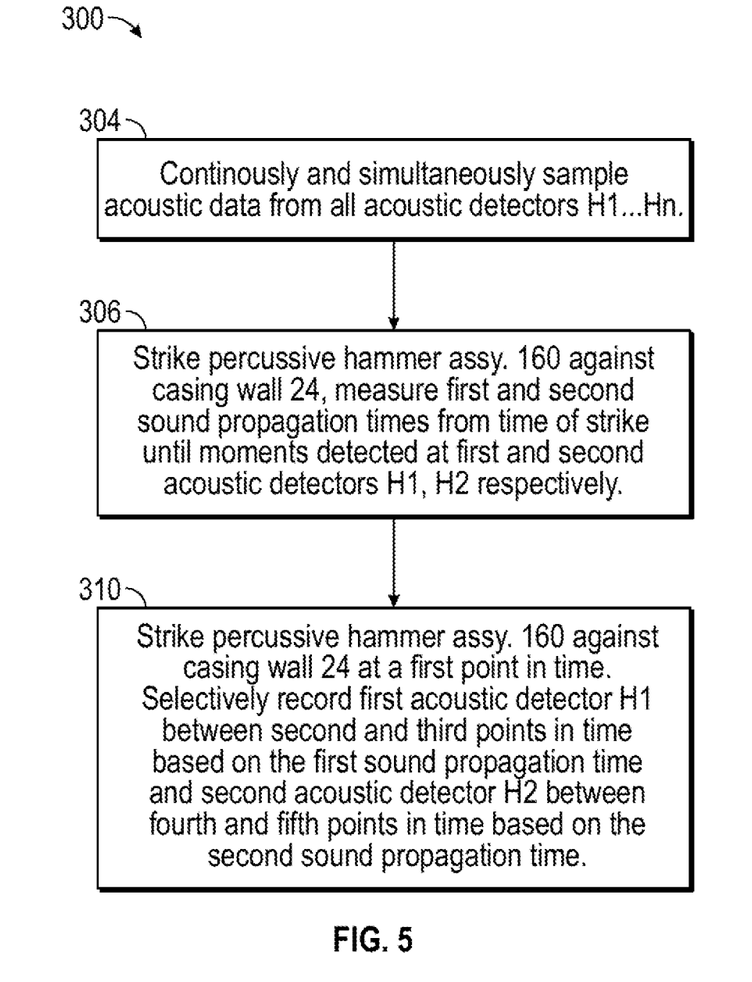
FIG. 5 is a flow chart of a method of logging according to an embodiment that may be implemented by the leak detection system of FIG. 1.

Referring to FIG. 5, in one or more embodiments, a conventional leak detection logging technique 304 of continuously and simultaneously sampling multiple acoustic detector channels at a high rate may be performed. For example, ten acoustic detector channels may be simultaneously sampled at 500 kSPs, resulting in a fast data stream of up to 80 Mbps.

The speed at which sound waves propagate may vary with the depth of the well or from well to well. Accordingly, while continuously and simultaneously sampling acoustic detectors H1 . . . $H_n$ (FIG. 2B), at step 304, a self-tuning/learning step 306 may be performed to compensate for different speeds of sound. Step 306 may be performed at the beginning of a particular logging job and may be repeated periodically as the well conditions change with depth. During self-tuning step 306, CPU 210 (FIG. 4) may cause percussive hammer assembly 160 to strike one or more times against the interior wall of casing 24, each strike separated in time long enough for the sound waves to pass each acoustic detector H1 . . . $H_n$. The acoustic data may be collected continuously during step 306 and thereafter analyzed to identify and quantify sound propagation times from a given knock to the moments when the sound wave produced by the knock reaches each acoustic detector H1 . . . $H_n$. After a series of such "learning" knocks, CPU 210 may develop a recording schedule for subsequent logging operations (step 310), wherein each acoustic detector H1 . . . $H_n$ is only sampled during the time interval when a knock-generated wave should be detected.

In one or more embodiments, steps 304 and/or 306 may be omitted. Estimated sound propagation times, based on past experience or modeling, for example, may be used for subsequent logging operations at step 310.

At step 310, acoustic data acquisition may be initiated either by a command from the surface via telemetry circuitry 220 (FIG. 4) or by a predefined configuration parameters. In one or more embodiments, CPU 210 may direct percussive hammer assembly 1602 generate knocks against the interior wall of casing 24 (FIG. 2B) separated by a preselected or real-time configurable time interval. Concurrently, CPU 210 may direct ADC 216 to collect acoustic data from acoustic detectors H1 . . . $H_n$ in time windows established at step 306 or based on estimated sound propagation times. That is, percussive hammer assembly 160 may be struck against casing 24 at a first point in time, and acoustic data may be selectively recorded from a first acoustic detector H1 between second and third points in time after the first point in time, with the second and third points in time determined by a first sound propagation time from percussive hammer assembly 160 to first acoustic detector H1. Likewise, acoustic data from a second acoustic detector H2 may be selectively recorded between fourth and fifth points in time after the first point in time, with the fourth and fifth points in time determined by a second sound propagation time from percussive hammer assembly 160 to second acoustic detector H2.

It should be noted that selective recording times for various acoustic detectors may but will not necessarily overlap. That is the fourth point in time for beginning to record data from second acoustic detector H2 may occur before the third point in time for ceasing recording data from first acoustic detector H1.

Data acquisition intervals may be estimated as illustrated in the following non-limiting example. Given a sound propagation speed of 1500 m/s in water, acoustic detectors H1 . . . $H_n$ separated by 15 cm distance will detect a percussive hammer excited wave propagating through the water with a 100 μs delay for every such acoustic detector interval. CPU 210 may selectively record data from every acoustic detector during some time interval (e.g. 80 μs) with a 100 μs delay between neighboring detectors. If the acoustic detector array includes five hydrophones, a knock may be generated once per millisecond (1000 Hz) or less, and the total recording time will be 400 μs per 1 ms. This this example, only one channel is recorded at the same time.

As disclosed herein logging tool 150 and logging method 300 allow acoustic detectors to be sampled only for the periods of time when an excited sound wave produced by percussive hammer assembly 160 can be observed. Because only useful data is collected, the collected data becomes significantly less voluminous so that full data may be quickly downloaded or transmitted in real time. Because logging tool 150 has a high duty cycle, tool 150 may be moved much faster within a well during logging operations, lowering cost. Additional advantages may include continuous measurement of the sound speed in the well, continuous monitoring of the well for leaks while reporting the results to the surface in real time, and detection of inconsistencies on casing walls such as corrosion, deformations, etc.

In summary, a logging tool and a method for logging have been described. Embodiments of a logging tool may generally have: A percussive hammer assembly; a first acoustic detector; a data acquisition system coupled to the first acoustic detector for selectively recording data therefrom; and a control system coupled between the percussive hammer assembly and the data acquisition system and arranged to actuate the percussive hammer assembly at a first point in time and enable data collection from the first acoustic detector by the data acquisition system at a selective second point in time after the first point in time. Embodiments of a method for logging tool may generally include: Striking a percussive hammer assembly against a wellbore casing at a first point in time; and selectively recording data from a first acoustic detector between second and third points in time after the first point in time, the second and third points in time determined by a first sound propagation time from the percussive hammer assembly to the first acoustic detector.

Any of the foregoing embodiments may include any one of the following, alone or in combination with each other: A second acoustic detector, the data acquisition system coupled to the second acoustic detector for selectively recording data therefrom, the second acoustic detector located at a predetermined distance along an axis of the logging tool from the first acoustic detector, the first acoustic detector positioned longitudinally between the percussive hammer assembly and the second acoustic detector; the control system arranged to cease data collection from the first acoustic detector by the data acquisition system at a selective third point in time after the second point in time, to enable data collection from the second acoustic detector by the data acquisition system and at a selective fourth point in time after the second point in time, and to cease data collection from the second acoustic detector by the data acquisition system at a selective this point in time after the fourth point in time; a telemetry system coupled to at least one of the data collection system and the control system; the percussive hammer assembly includes a rack and pinion driven by a motor, the motor selectively controlled by the control system; the percussive hammer assembly includes a solenoid and magnetic rod, the solenoid selectively controlled by the control system; the percussive hammer assembly includes a hydraulic piston-cylinder assembly fluidly coupled to a hydraulic pump, the pump selectively controlled by the control system; the control system is arranged to selectively control an excitation amplitude of the percussive hammer assembly; the first and second acoustic detectors include first and second hydrophones, respectively; the first and second acoustic detectors include first and second hydrophones, respectively; the control system is arranged to selectively perform a self-tuning operation wherein the control system enables continuous data collection from both the first and second acoustic devices and actuates the percussive hammer assembly to measure first and second propagation times from the percussive hammer assembly to the first and second acoustic devices, respectively; the control system is arranged to select the second and third points in time based on the first propagation time and the fourth and fifth points in time based on the second propagation time; selectively recording data from a second acoustic detector between fourth and fifth points in time after the first point in time, the fourth and fifth points in time determined by a second sound propagation time from the percussive hammer assembly to the second acoustic detector; selectively controlling an excitation amplitude of the percussive hammer assembly; and determining the first and second sound propagation times by continuously recording data from the first and second acoustic detectors, striking the percussive hammer assembly, and measuring time duration from the striking until the resultant sound wave is detected at the first and second acoustic detectors, respectively.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:
1. A logging tool, comprising:
a percussive hammer assembly;
a first acoustic detector;
a data acquisition system coupled to said first acoustic detector for selectively recording data therefrom; and
a control system coupled between said percussive hammer assembly and said data acquisition system and arranged to actuate said percussive hammer assembly at a first point in time, using a first set of parameters to define a first excitation amplitude, and enable data collection from said first acoustic detector by said data acquisition system at a selective second point in time after said first point in time;
wherein said control system is arranged to actuate the percussive hammer assembly against the wellbore casing using a second set of parameters to define a second excitation amplitude that is different from the first excitation amplitude.

2. The logging tool of claim 1 further comprising:
a second acoustic detector, said data acquisition system coupled to said second acoustic detector for selectively recording data therefrom, said second acoustic detector located at a predetermined distance along an axis of said logging tool from said first acoustic detector, said first acoustic detector positioned longitudinally between said percussive hammer assembly and said second acoustic detector;
said control system arranged to cease data collection from said first acoustic detector by said data acquisition system at a selective third point in time after said second point in time, to enable data collection from said second acoustic detector by said data acquisition system and at a selective fourth point in time after said second point in time, and to cease data collection from said second acoustic detector by said data acquisition system at a selective fifth point in time after said fourth point in time.

3. The logging tool of claim 2 further comprising:
a telemetry system coupled to at least one of said data collection system and said control system.

4. The logging tool of claim 1 wherein:
said percussive hammer assembly includes a rack and pinion driven by a motor, said motor selectively controlled by said control system.

5. The logging tool of claim 1 wherein:
said percussive hammer assembly includes a solenoid and magnetic rod, said solenoid selectively controlled by said control system.

6. The logging tool of claim 1 wherein:
said percussive hammer assembly includes a hydraulic piston-cylinder assembly fluidly coupled to a hydraulic pump, said pump selectively controlled by said control system.

7. The logging tool of claim 2 wherein:
said first and second acoustic detectors include first and second hydrophones, respectively.

8. The logging tool of claim 2 wherein:
said control system is arranged to selectively perform a self-tuning operation wherein said control system enables continuous data collection from both said first and second acoustic devices and actuates said percussive hammer assembly to measure first and second propagation times from said percussive hammer assembly to said first and second acoustic devices, respectively.

9. The logging tool of claim 8 wherein:
said control system is arranged to select said second and third points in time based on said first propagation time and said fourth and fifth points in time based on said second propagation time.

10. A method of logging, comprising:
striking a percussive hammer assembly against a wellbore casing at a first point in time using a first set of parameters to define a first excitation amplitude;
selectively recording data from a first acoustic detector between second and third points in time after said first point in time, said second and third points in time determined by a first sound propagation time from said percussive hammer assembly to said first acoustic detector; and
striking the percussive hammer assembly against the wellbore casing using a second set of parameters to define a second excitation amplitude that is different from the first excitation amplitude.

11. The method of claim 10 further comprising:
selectively recording data from a second acoustic detector between fourth and fifth points in time after said first point in time, said fourth and fifth points in time determined by a second sound propagation time from said percussive hammer assembly to said second acoustic detector.

12. The method of claim 11 further comprising:
determining said first and second sound propagation times by continuously recording data from said first and second acoustic detectors, striking said percussive hammer assembly, and measuring time duration from said striking until the resultant sound wave is detected at said first and second acoustic detectors, respectively.

13. The logging tool of claim 1,
wherein the percussive hammer assembly is spaced from the first acoustic detector by a first distance; and
wherein a delay in time between the first point in time and the second point in time is a function of the first distance.

14. The logging tool of claim 2, wherein the fourth point in time occurs prior to the third point in time.

15. The method of claim 10,
wherein the percussive hammer assembly is spaced from the first acoustic detector by a first distance along a logging tool; and
wherein a delay in time between the first point in time and the second point in time is a function of the first distance.

16. The method of claim 11, wherein the fourth point in time occurs prior to the third point in time.

* * * * *